(12) United States Patent
Sato et al.

(10) Patent No.: US 6,771,247 B2
(45) Date of Patent: Aug. 3, 2004

(54) DISPLAY AND METHOD OF DRIVING DISPLAY

(75) Inventors: Hajime Sato, Saitama-ken (JP); Hiroyuki Kimura, Saitama-ken (JP); Takashi Maeda, Saitama-ken (JP); Takanori Tsunashima, Saitama-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 160 days.

(21) Appl. No.: 09/812,571

(22) Filed: Mar. 21, 2001

(65) Prior Publication Data

US 2001/0024187 A1 Sep. 27, 2001

(30) Foreign Application Priority Data

| Mar. 22, 2000 | (JP) | ..................................... 2000-080442 |
| Jul. 10, 2000 | (JP) | ..................................... 2000-208309 |
| Oct. 25, 2000 | (JP) | ..................................... 2000-325727 |
| Dec. 6, 2000 | (JP) | ..................................... 2000-371825 |

(51) Int. Cl.[7] ................................................ G09G 3/36
(52) U.S. Cl. ............................................. 345/98; 345/90
(58) Field of Search ................................ 345/87, 90, 92, 345/93, 96, 98, 100, 211–214, 530–532, 534

(56) References Cited

U.S. PATENT DOCUMENTS

| 5,712,652 A | | 1/1998 | Sato et al. | |
|---|---|---|---|---|
| 5,798,746 A | * | 8/1998 | Koyama | ....................... 345/98 |
| 5,945,972 A | * | 8/1999 | Okumura et al. | .............. 345/98 |
| 5,952,991 A | | 9/1999 | Akiyama | |
| 6,064,362 A | * | 5/2000 | Brownlow et al. | ........... 345/98 |
| 6,331,844 B1 | * | 12/2001 | Okumura et al. | .............. 345/87 |
| 6,456,267 B1 | * | 9/2002 | Sato et al. | ..................... 345/92 |

FOREIGN PATENT DOCUMENTS

| EP | 0 622 655 | 11/1994 |
|---|---|---|
| EP | 0 780 826 | 6/1997 |
| EP | 0 898 263 | 2/1999 |
| WO | WO 99/59127 | 11/1999 |

* cited by examiner

Primary Examiner—Henry N. Tran
(74) Attorney, Agent, or Firm—Oblon, Spivak, McClelland, Maier & Neustadt, P.C.

(57) ABSTRACT

A display has display pixels provided with digital memories, respectively. In each display pixel, a pixel electrode and a data line are connected to each other through a first switch, and the pixel electrode and the digital memory are connected to each other through a second switch. In a first display period, the second switches are turned off and the first switches are turned on, to display video data supplied from the data lines. In a second display period, the second switches are turned on and the first switches are turned off, to stop scan and data drivers and display video data stored in the digital memories.

29 Claims, 11 Drawing Sheets

DRIVER AREA | PIXEL AREA

DISPLAY AND METHOD OF DRIVING DISPLAY

CROSS REFERENCE TO RELATED APPLICATIONS

This application is based upon and claims the benefit of priority under 35USC §119 to Japanese Patent Application No. 2000-80442 filed on Mar. 22, 2000, No. 2000-208309 filed on Jul. 10, 2000, No. 2000-325727 filed on Oct. 25, 2000, and No. 2000-371825 filed on Dec. 6, 2000, the entire contents of which are incorporated by reference herein.

BACKGROUND OF THE INVENTION

1. Field of the Invention

The present invention relates to displays for cellular phones, electronic books, etc. In particular, the present invention relates to a display having a digital memory for each display element and a method of driving such a display.

2. Description of the Related Art

Flat displays are becoming the mainstream of displays. Among the flat displays, liquid crystal displays (LCDs) are light, thin, and low-power-consumption, and therefore, are widely used for compact information terminals such as cellular phones and electronic books. These information terminals are usually driven by batteries, and due to this, reducing power consumption is a critical problem for them.

For example, the cellular phones are required to display images during a standby period at low power consumption. To achieve this, U.S. Pat. No. 5,712,652 discloses an image display having a memory cell (corresponding to a digital memory of the present specification) for each pixel. During a standby period (still-image display period), the image display activates only an AC driver for driving liquid crystals with alternating current and deactivates other peripheral drivers. This display is appropriate for displaying images involving no halftones at low power consumption. When applied to a cellular phone, this display shows images at low power consumption during a standby period.

Recent cellular phones have functions of displaying content from the Internet, or the images of the other ends of the phones. Images displayed during a data communication period (sometimes referred to as a "normal display period" herein) are usually full-color halftone images or moving images. Future cellular phones will have to be capable of not only operating at low power during a standby period but also displaying full-color, high-quality images during a data communication period.

The image display of U.S. Pat. No. 5,712,652 limits pixel voltage to two values. Due to this, the display is able to display an image with eight colors during a standby period but is unable to display full-color halftone images or moving images during a data communication period.

A conventional LCD with digital memories keeps still-image data in the digital memories when a still-image display period is switched to a normal display period. At the start of the next still-image display period, the still-image data stored in the digital memories is displayed until new still-image data is written into the digital memories. Namely, when a normal display period is switched to a still-image display period, a previous irrelevant image is momentarily displayed to provide a user with an unpleasant feeling or a disturbed image.

The LCD with digital memories alternately drives an entire display panel according to the output (or inverted output) of the digital memories, and therefore, load to drive during a still-image display period is extremely large compared with load to drive during a normal display period. This causes a voltage drop in a power source for the digital memories. If the digital memories supply video data stored therein to pixels before restoring the original potential thereof, a memory malfunction occurs to incorrectly display the video data. To prevent such a voltage drop, power source wires of the digital memories must have low resistance. To have low resistance, the power source wires must be widened on a substrate. This, however, increases pixel pitches and a frame area around a display panel of the LCD.

In addition, the power source wires of the digital memories increase the total number of wires on a substrate in the LCD, to enlarge pixel pitches, hinder high resolution, increase wire-to-wire short circuits, and deteriorate yield.

SUMMARY OF THE INVENTION

An object of the present invention is to provide a display, capable of displaying multicolor images at low power consumption during a standby period and full-color halftone images and moving images during a communication period, and a method of driving such a display.

Another object of the present invention is to provide a method of driving a display, capable of maintaining the quality of images when a still-image display period is switched to a normal display period.

Still another object of the present invention is to provide a display, capable of preventing a memory malfunction during a standby period, always displaying correct images, realizing high resolution, and reducing a frame area around a display panel.

Still another object of the present invention is to provide a display, capable of operating at low power and improving resolution and yield.

In order to accomplish the objects, a first aspect of the present invention provides a display having a first electrode substrate. The first electrode substrate has scan lines, data lines intersecting the scan lines, pixel electrodes formed at the intersections of the scan and data lines, respectively, and first switches provided for the pixel electrodes, respectively. Each first switch is turned on and off in response to a scan signal supplied from the scan line, and when turned on, electrically connects the data line to the pixel electrode so that video data from the data line is written into the pixel electrode. The display further has a second electrode substrate having common electrode that face the pixel electrodes with a predetermined gap between them, a display layer held between the first and second electrode substrates, a data driver for supplying video data to the data lines , and a scan driver for sequentially supplying a scan signal to the scan lines. The first electrode substrate has digital memories electrically connected to the pixel electrodes, respectively, and holding video data supplied from the data lines, and second switches each inserted between the corresponding pixel electrode and digital memory, to control conduction between the pixel electrode and the digital memory.

A second aspect of the present invention provides a display having a first electrode substrate. The first electrode substrate has scan lines, data lines intersecting the scan lines, pixel electrodes formed at the intersections of the scan and data lines, respectively, auxiliary capacitors electrically connected in parallel with the pixel electrodes, respectively, auxiliary capacitor lines for supplying a predetermined voltage to the auxiliary capacitors, first switches provided for the pixel electrodes, respectively, each first switch being turned on and off in response to a scan signal supplied from the corresponding scan line, and when turned on, writing video data from the corresponding data line into the corresponding pixel electrode, digital memories electrically connected to the pixel electrodes, respectively, and holding video data supplied from the data lines, and second switches each arranged between the corresponding pixel electrode and digital memory, to control conduction between the pixel electrode and the digital memory. The display further has a second electrode substrate having common electrode that face the pixel electrodes with a predetermined gap between them, and a display layer held between the first and second electrode substrates. The auxiliary capacitor lines also serve as power source lines for the digital memories.

A third aspect of the present invention provides a display having a first electrode substrate. The first electrode substrate has scan lines, data lines intersecting the scan lines, pixel electrodes formed at the intersections of the scan and data lines, respectively, auxiliary capacitors electrically connected in parallel with the pixel electrodes, respectively, auxiliary capacitor lines for supplying a predetermined voltage to the auxiliary capacitors, first switches provided for the pixel electrodes, respectively, each first switch being turned on and off in response to a scan signal supplied from the corresponding scan line, and when turned on, electrically connecting the corresponding data line to the corresponding pixel electrode so that video data from the data line is written into the pixel electrode, digital memories electrically connected to the pixel electrodes, respectively, and holding video data supplied from the data lines, second switches each arranged between the corresponding pixel electrode and digital memory, to control conduction between the pixel electrode and the digital memory, and memory control lines provided for the second switches, respectively, for supplying memory control signals to turn on and off the second switches. The display further has a second electrode substrate having common electrode that face the pixel electrodes with a predetermined gap between them, and a display layer held between the first and second electrode substrates. Potential controllers are connected between the second switches and the memory control lines, to control a rise of each memory control signal.

A fourth aspect of the present invention provides a display having a first electrode substrate. The first electrode substrate has scan lines, data lines intersecting the scan lines, pixel electrodes formed at the intersections of the scan and data lines, respectively, and first switches provided for the pixel electrodes, respectively, each first switch being turned on and off in response to a scan signal supplied from the corresponding scan line, and when turned on, electrically connecting the corresponding data line to the corresponding pixel electrode so that video data from the data line is written into the pixel electrode. The display further has a second electrode substrate having common electrode that face the pixel electrodes with a predetermined gap between them, a display layer held between the first and second electrode substrates, a data driver for supplying video data to the data lines at horizontal scan intervals, and a scan driver for sequentially supplying a scan signal to the scan lines at the horizontal scan intervals. During a first display period, the second switches are turned off to cut conduction between the pixel electrodes and the digital memories while the first switches are turned on at predetermined intervals to write video data from the data lines into the pixel electrodes and display the video data. In a second display period, the second switches are turned on to store video data from the data lines into the digital memories, and thereafter, the first switches are turned off to cut conduction between the data lines and the pixel electrodes, so that the video data stored in the digital memories is written into the pixel electrodes and is displayed.

DESCRIPTION OF THE PREFERRED EMBODIMENTS

Various embodiments of the present invention will be explained with reference to the accompanying drawings. In the following explanation, the present invention is applied to active matrix LCDs having digital memories.

In this specification, the word "video data" covers motion video data and still video data. The motion video data is supplied in a normal display period, to display full-color halftone images and moving images. The still video data is supplied in a still-image display period, to display multi-color (eight colors) still images. If the word "video data" is used for another meaning, it will be defined at the instance.

Embodiment 1

Figure 1:
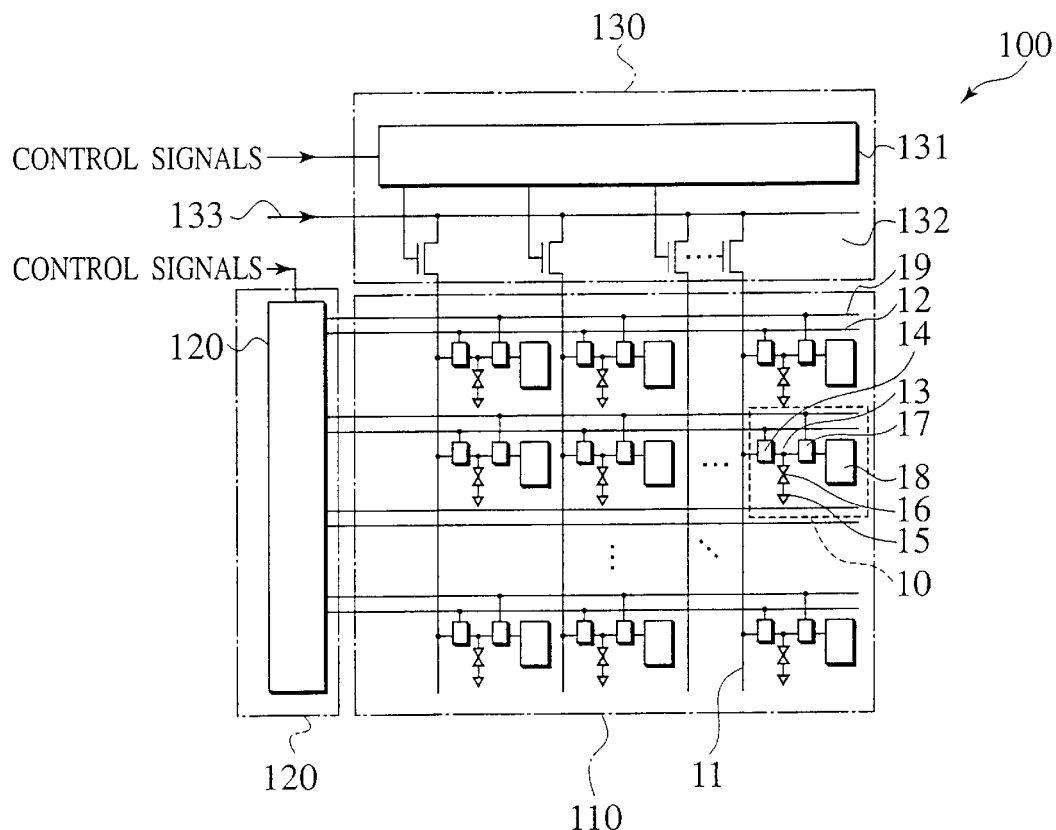
FIG. 1 is a circuit diagram showing an LCD according to embodiment 1 of the present invention.
Figure 2:
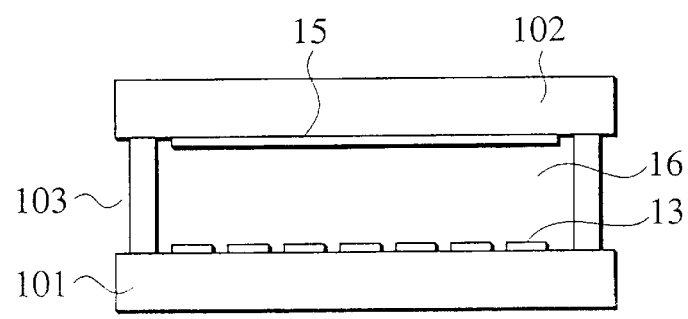
FIG. 2 is a sectional view roughly showing the structure of the LCD of FIG. 1.

FIG. 1 is a circuit diagram showing an LCD according to the embodiment 1 of the present invention, and FIG. 2 is a sectional view roughly showing the structure of the LCD of FIG. 1.

In FIG. 1, the LCD 100 has a display panel 110, a scan driver 120, and a data driver 130. The drivers 120 and 130 drive the display panel 110.

Figure 3:
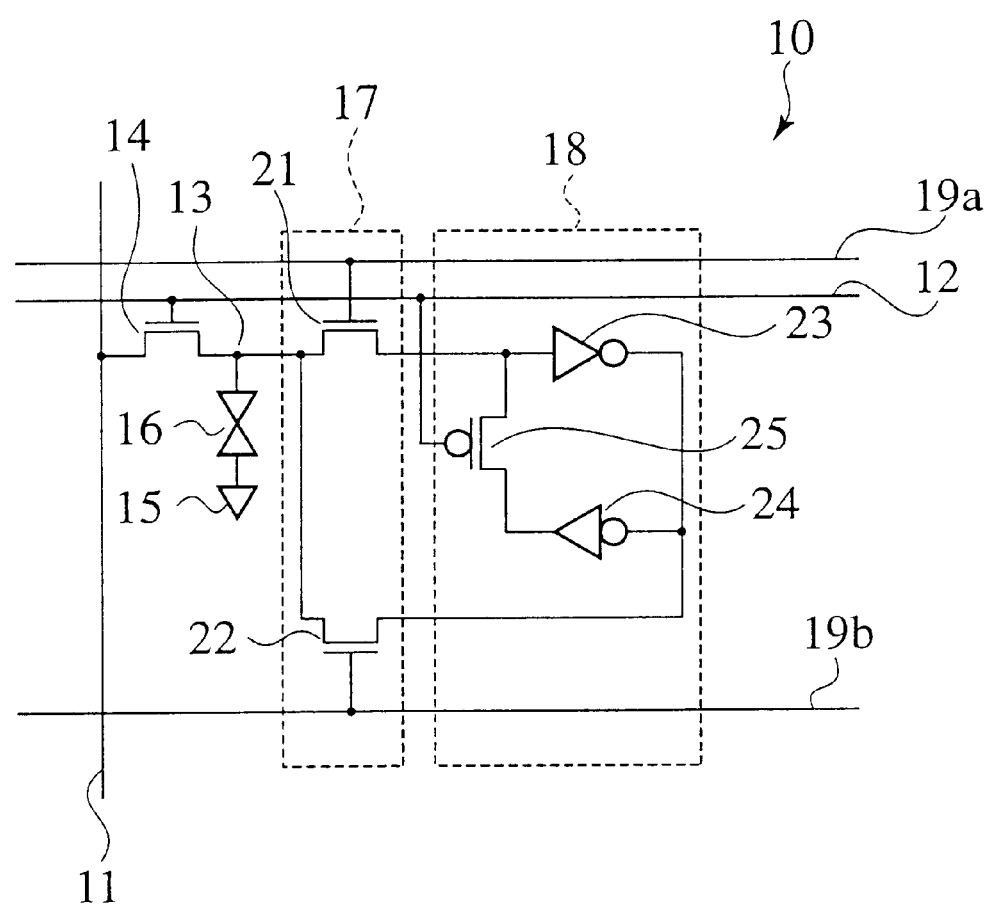
FIG. 3 is a circuit diagram showing a display pixel according to the embodiment 1.

The display panel 110 includes an array substrate 101 (FIG. 2) having data lines 11 and scan lines 12. These lines 11 and 12 intersect each other with an insulating film (not shown) interposing between them. In parallel with the scan lines 12, there are memory control lines 19. The memory control lines 19 in FIG. 1 are symbolically drawn for the sake of simplicity. In practice, each memory control line 19 is composed of two lines 19a and 19b as shown in FIG. 3.

At each intersection of the signal and scan lines 11 and 12, a display pixel 10 is formed. An end of each data line 11 is connected to the data driver 130. An end of each scan line 12 and an end of each memory control line 19 are connected to the scan driver 120.

The display pixel 10 consists of a pixel electrode 13, a first switch 14, a common electrode 15, a liquid crystal layer 16, a second switch 17, and a digital memory 18.

The first switch 14 has a source connected to the data line 11, a gate connected to the scan line 12, and a drain connected to the pixel electrode 13. The pixel electrode 13 is connected to the digital memory 18 through the second switch 17. The second switch 17 has a gate connected to the memory control line 19, a source connected to the pixel electrode 13, and a drain connected to the digital memory 18. The structures of the second switch 17 and digital memory 18 will be explained later. Although not shown in FIG. 2, the pixel electrode 13 is electrically connected to an auxiliary capacitor in parallel. The auxiliary capacitor will be explained in connection with the embodiment 3 and other embodiments that follow.

In FIG. 2, the pixel electrodes 13 is formed on the array substrate 101. The common electrode 15 facing the pixel electrodes 13 are formed on an opposing substrate 102. The common electrode 15 receives a predetermined counter potential from an external driver (not shown). Between the pixel electrodes 13 and the common electrode 15, the liquid crystal layer 16 serving as a display layer is held. The peripheries of the substrates 101 and 102 are sealed with a seal material 103.

The array substrate 101 is a first electrode substrate, and the opposing substrate is a second electrode substrate.

The scan driver 120 consists of a shift register 121, a buffer circuit (not shown), etc. In response to control signals (vertical clock and start signals) from the external driver (not shown), the scan driver 120 provides a scan signal to sequentially set the potential of the scan lines 12 to an ON or OFF level.

The scan driver 120 provides a memory control signal at predetermined timing to simultaneously set the potential of all of the memory control lines 19 to an ON or OFF level. More precisely, the scan driver 120 simultaneously sets the potential of the memory control lines 19 to the OFF level and sequentially sets the scan lines 12 to the ON level in a period to display full-color halftone images and moving images. This period is referred to as "halftone/motion display period." In a still-image display period, the scan driver 120 simultaneously sets the potential of the memory control lines 19 to the ON level and the scan lines 12 to the OFF level. The memory control signal may be supplied from the external driver (not shown) instead of the scan driver 120.

The data driver 130 consists of a shift register 131, analog switches 132, etc. The data driver 130 receives control signals (horizontal clock and start signals) from the external driver and video data from a video bus 133. In response to the horizontal clock and start signals, the data driver 130 provides, from the shift register 131, switch signals for the analog switches 132, so that video data from the video bus 133 is sampled by the data lines 11 at predetermined timing.

In the LCD 100 of the embodiment 1, the scan driver 120, data driver 130, data lines 11, scan lines 12, and pixel electrodes 13 are integrally formed on the array substrate 101. The scan driver 120 and data driver 130 may be formed on an external circuit substrate where the external driver (not shown) is formed.

A technique of driving the LCD 100 as a standard active matrix LCD will roughly be explained.

The scan driver 120 successively provides a scan signal of ON level to the first switches 14 through the scan lines 12, to successively make the first switches 14 conductive for a horizontal scan period. During this period, video data supplied from the data driver 130 and sampled by the data lines 11 is written into the pixel electrodes 13 through the first switches 14. In each display pixel 10, the video data is charged as a signal voltage between the pixel electrode 13 and the common electrode 15. Depending on the magnitude of the signal voltage, the liquid crystal layer 16 reacts to control a transmission light quantity of the display pixel 10. This write operation is repeated for one to several frames, to display an image.

The structure of the display pixel 10 will be explained with reference to FIG. 3.

The second switch 17 consists of switch elements 21 and 22 and is connected between the first switch 14 and the digital memory 18. The switch element 21 has a gate connected to the memory control line 19a, and the switch element 22 has a gate connected to the memory control line 19b. The potential levels of the memory control lines 19a and 19b are separately controlled by memory control signals provided by the scan driver 120. The second switch 17 and first switch 14 are made of MOS transistors.

The digital memory 18 consists of inverters 23 and 24 and a third switch 25. The embodiment 1 forms the digital memory 18 with two inverters and one switch, to reduce the number of elements and simplify peripheral circuits. The structures of the inverters 23 and 24 will be explained in the embodiment 3 and other embodiments that follow. Power source wiring for the digital memory 18 is not shown in FIG. 3.

The third switch 25 has a channel opposite to that of the first switch 14. Namely, the third switch 25 is made of a MOS transistor that is complementary to the MOS transistor of the first switch 14. The third switch 25 has a gate connected to the scan line 12 to which the gate of the first switch 14 is connected. Accordingly, a single scan signal from the scan line 12 simultaneously turns on and off the first and third switches 14 and 25.

Figure 4:
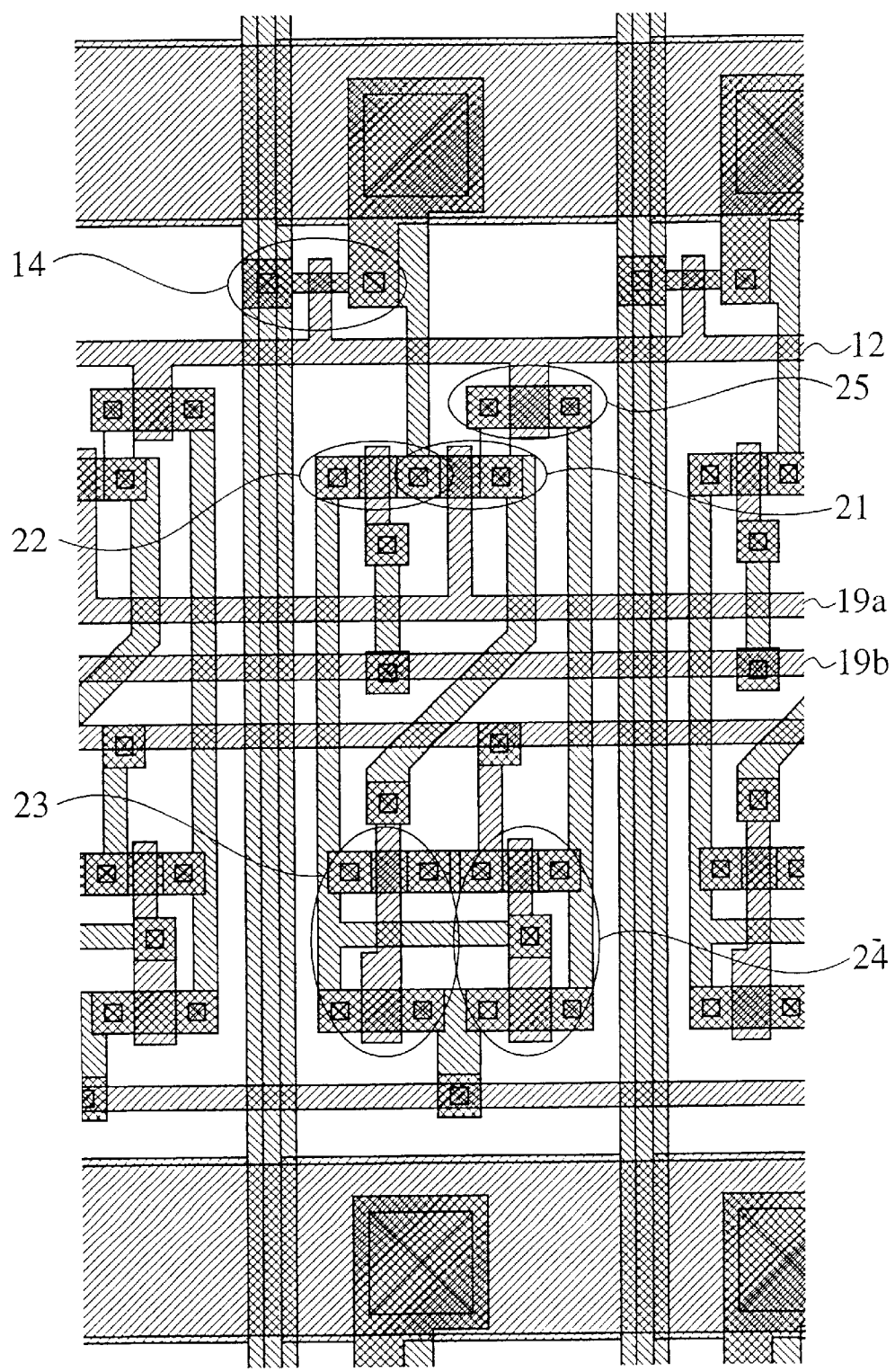
FIG. 4 is a plan view showing the display pixel of FIG. 3.

FIG. 4 is a plan view showing the display pixel of FIG. 3. The first switch 14, switch elements 21 and 22, inverters 23 and 24, memory control lines 19a and 19b, and third switch 25 of FIG. 3 are arranged on the array substrate 101 as shown in FIG. 4.

The operation of the LCD 100 of the embodiment 1 will be explained with reference to the signal timing chart of FIG. 5. A normal display period is a first display period, and a still-image display period is a second display period.

Figure 5:
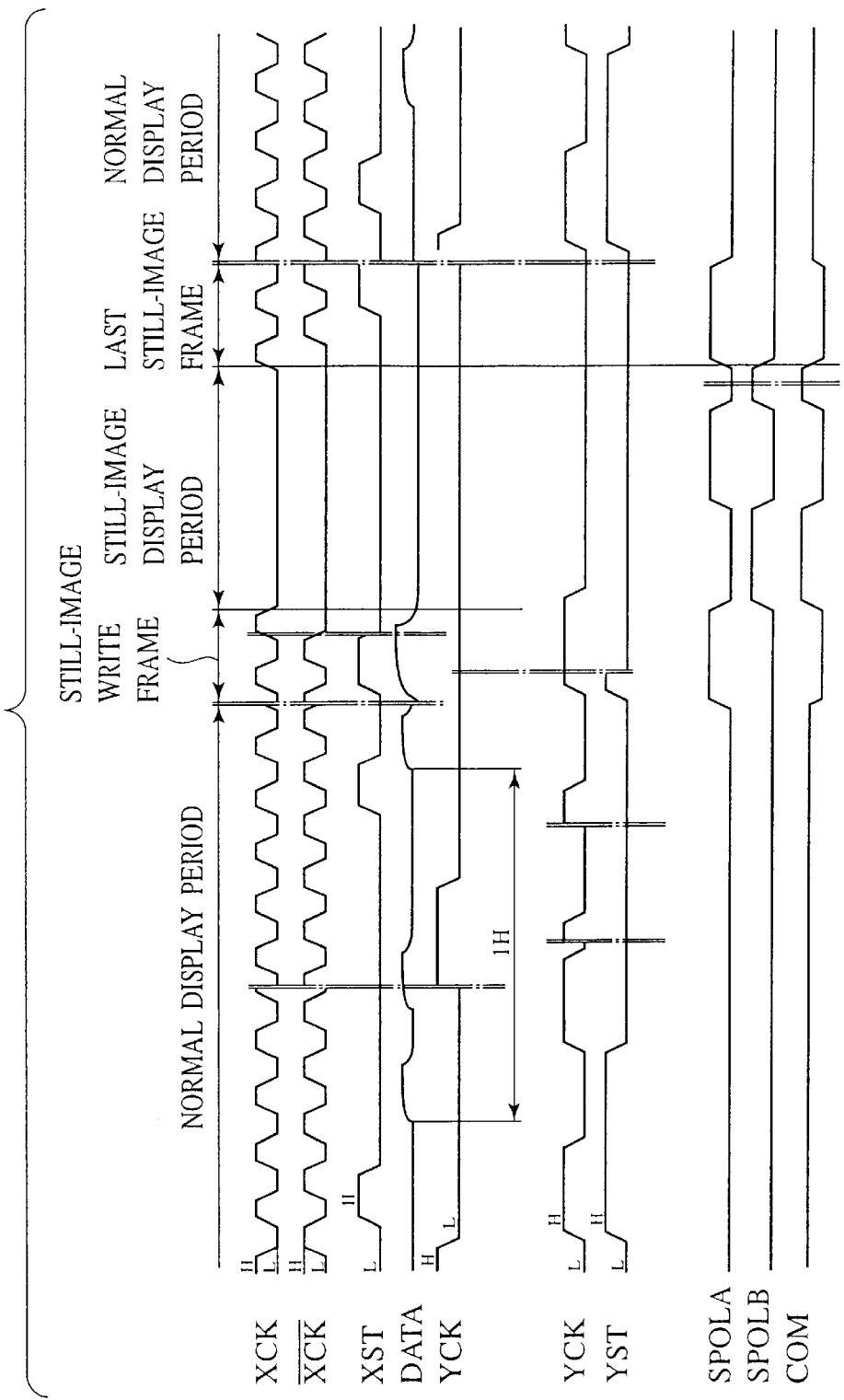
FIG. 5 is a timing chart showing the operation of the LCD of the embodiment 1.

In FIG. 5, there are horizontal clock signals XCK and /XCK (inversion of XCK), a horizontal start signal XST, video data DATA from the video bus 133, a vertical clock signal YCK, a vertical start signal YST, a memory control signal SPOLA supplied to the memory control line 19a, a memory control signal SPOLB supplied to the memory control line 19b, and a signal COM to the common electrode 15.

In a normal display period, the scan driver 120 sets the memory control lines 19a and 19b to an OFF level to disable the second switches 17. During this period, the scan and data drivers 120 and 130 receive the horizontal/vertical clock and start signals and video data, to carry out a standard active matrix LCD operation to display full-color, halftone, high-quality images and moving images.

To switch the normal display period to a still-image display period, the memory control line 19a is set to an ON level in a still-image write frame at the end of the normal display period. Within this frame, in any display pixel 10 with the first switch 14 being conductive due to an ON scan signal, still-image data sampled by the data line 11 is written into the digital memory 18 through the first switch 14 and switch element 21.

The still-image data written into the digital memory 18 is retained as it is only for a short time. For a long time of retention, direct-current components will deteriorate the liquid crystal layer 16. Accordingly, the display pixels 10 must be driven with alternating current during the still-image display period. The embodiment 1 alternately sets the memory control lines 19a and 19b to an ON level at predetermined intervals, to alternately make the switch elements 21 and 22 conductive, and at the same time, inverts the potential of the common electrode 15, thereby realizing the alternating current driving. This prevents direct current components from being applied to the liquid crystal layer 16, to thereby secure the quality of the liquid crystal layer 16 for a long time.

Alternately making the switch elements 21 and 22 conductive alternately applies high and low source potentials to the pixel electrode 13. In synchronization with this, the potential of the common electrode 15 is alternated between high and low values. As a result, any display pixel 10 having the same polarity as the common electrode 15 applies no voltage to the liquid crystal layer 16, and any display pixel having the opposite polarity from the common electrode 15 applies a voltage to the liquid crystal layer 16, to display a multicolor image based on binary still-image data. At this time, elements that are operating on the display panel 110 are only the low-frequency memory control lines 19a and 19b and the common electrode 15. The embodiment 1, therefore, displays a multicolor image at low power consumption during a standby period (still-image display period).

When the still-image display period is switched to a normal display period, the memory control lines 19a and 19b are set to an OFF level after the last still image frame, and the horizontal/vertical clock and start signals and video data are supplied to the scan and data drivers 120 and 130, to display full-color, halftone, high-quality images and moving images.

The LCD 100 of the embodiment 1 connects the pixel electrode 13 to the data line 11 through the first switch 14 and arranges the second switch 17 between the pixel electrode 13 and the digital memory 18 in each display pixel 10. During a normal display period, the embodiment 1 disables the second switches 17 and makes the first switches 14 conductive, to display video data supplied from the data lines 11. During a standby period, the embodiment 1 disables the first switches 14, makes the second switches 17 conductive, and stops the scan and data drivers 120 and 130, to display video data stored in the digital memories 18. When the LCD 100 is applied to a cellular phone, it can display full-color half tone images and moving images during a data communication period using the Internet, and during a standby period, a multicolor image at low power consumption.

Figure 6A:
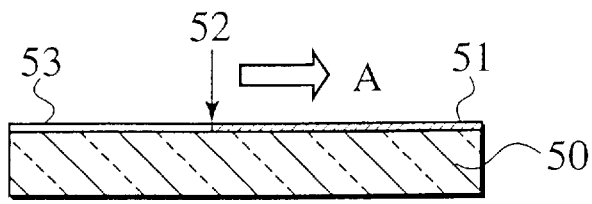
FIGS. 6A to 6F are sectional views showing the manufacturing processes of the LCD of the embodiment 1.

A method of manufacturing the LCD 100 of the embodiment 1 will be explained with reference to FIGS. 6A to 6F, which are sectional views roughly showing the manufacturing processes of the LCD 100. In each of these figures, a right side area corresponds to the display panel 110 of FIG. 1, and a left side area corresponds to a driver area where, for example, the scan driver 120 of FIG. 1 is formed. The manufacturing processes (1) to (6) will be explained.
(1) Forming Polysilicon Film (FIG. 6A)

Figure 6B:
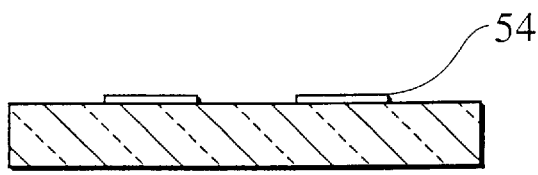

On a transparent insulating substrate 50 made of, for example, glass, an amorphous silicon (a-Si) thin film 51 is deposited to a thickness of 50 nm by plasma CVD. The thin film 51 is annealed to form a polycrystalline structure by XeCl excimer laser (not shown). The XeCl excimer laser scans the thin film 51 with a laser beam 52 in a direction A. The area scanned with the laser beam 52 is changed into a polysilicon film 53. At this time, laser energy may be increased step by step to carry out laser irradiation several times to effectively remove hydrogen from the amorphous silicon film and prevent ablation during crystallization. The laser energy is preferably in the range of 200 to 500 mJ/cm$^2$.
(2) Patterning (FIG. 6B)

Figure 6C:
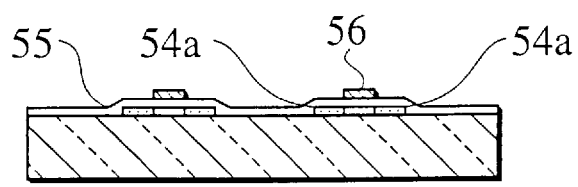

The polysilicon film 53 is patterned by photolithography to form an active layer 54 for thin film transistors.
(3) Forming Gate Electrode (FIG. 6C)

A silicon oxide film serving as a gate insulating film 55 is formed by plasma CVD. A molybdenum-tungsten alloy film is formed by spattering and is patterned to form gate electrodes 56. At the patterning, scan lines are also formed. The gate insulating film 55 may be a silicon nitride film or a silicon oxide film formed by atmospheric-pressure CVD.

Figure 6D:
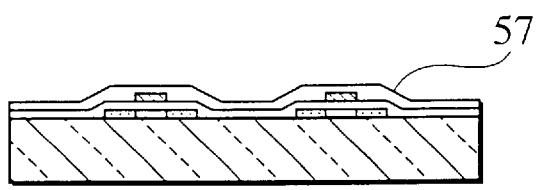

The gate electrodes 56 are used as masks to implant impurities by ion doping to form source/drain regions 54a for the thin film transistors. The impurities are, for example, phosphorus for n-channel transistors and boron for p-channel transistors. For pixel transistors, it is effective to form LDD (lightly doped drain) structures to suppress leak current during an OFF period. For this purpose, the gate electrodes 56 are again patterned and thinned by a predetermined amount after implanting the impurities for the source/drain regions 54a, and impurities are again implanted at low concentration.
(4) Forming First Insulating Interlayer (FIG. 6D)

Figure 6E:
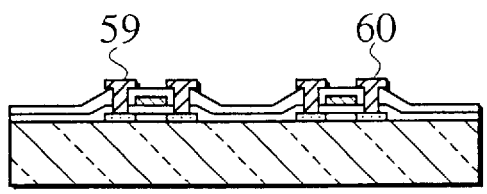

On the gate electrodes 56, a silicon oxide film serving as a first insulating interlayer 57 is formed by plasma CVD or atmospheric-pressure CVD.
(5) Forming Source/drain Electrodes (FIG. 6E)

Figure 6F:
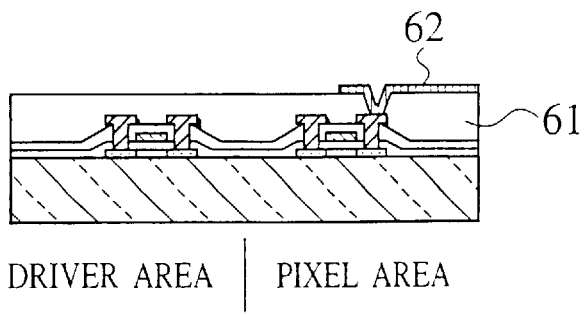

Contact holes are formed through the first insulating interlayer 57 and gate insulating layer 55. An Al film is formed by spattering and is pattered into source/drain electrodes 59 and 60. At this time, data lines are also formed.
(6) Forming Pixel Electrode (FIG. 6F)

On the Al film, an insulating film (second insulating interlayer) 61 having a low dielectric constant is formed. The insulating film 61 may be a silicon nitride film formed by plasma CVD, a silicon oxide film, or an organic insulating film, having a low dielectric constant. Contact holes are formed through the insulating film 61. An Al thin film 62 is formed and is patterned to form pixel electrodes.

Through these six processes, the display panel and drivers are integrally formed on the transparent insulating substrate 50. The substrate 50 is set to face a opposing substrate (not shown) having common electrode, and the peripheries of the substrates are sealed with sealing material such as epoxy resin. Between the substrates, a liquid crystal composition is injected and sealed to complete an LCD.

The electron mobility of a polysilicon (p-Si) TFT is higher than that of an amorphous silicon (a-Si) TFT by about two digits, and therefore, can be small in size. As a result, p-Si TFTs enable a display panel and peripheral drivers to be integrally formed on a substrate. The peripheral drivers are preferred to have CMOS structures to improve speed and reduce power consumption. To achieve this, the impurity doping process mentioned above is carried out in two steps, i.e., a p-type impurity doping step and an n-type impurity doping step with use of resist masks.

In this embodiment, the pixel electrodes 13 are light reflective pixel electrodes made of a metal thin film that needs no backlight. This further reduces power consumption compared with a transmission pixel electrode employing backlight. For example, a liquid crystal panel of 5-cm diagonal length and 250,000 pixels fabricated according to the processes mentioned above consumes only 5 mW of power to display a still image at a frame frequency of 60 Hz.

Embodiment 2

The embodiment 2 of the present invention relates to a method of driving the LCD 100 of the embodiment 1.

Figure 7:
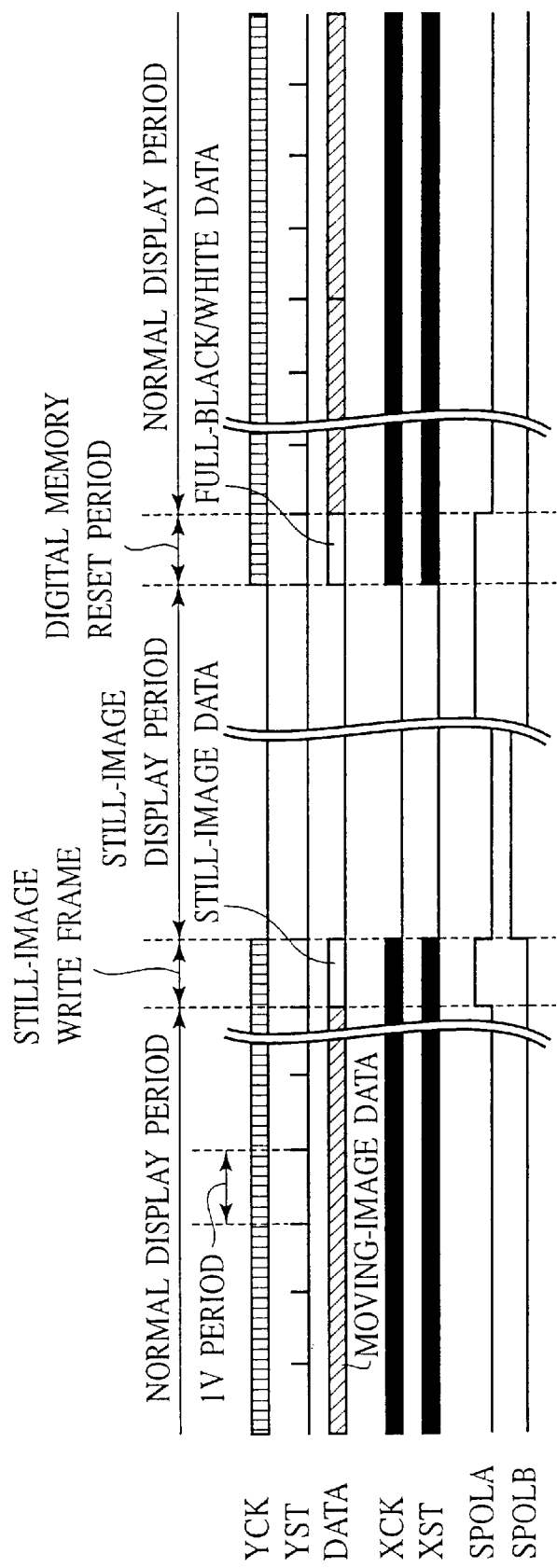
FIG. 7 is a timing chart showing an LCD driving method according to embodiment 2 of the present invention.

FIG. 7 is a timing chart showing the driving method of the embodiment 2. For the sake of easy understanding, signal waveforms of FIG. 7 are differently drawn from those of FIG. 5.

Operations of the embodiment 2 in a normal display period, a still-image write frame, and a still-image display period are the same as those of the embodiment 1, and therefore, are not explained again. In FIG. 7, a "1V" period means a vertical scan period. In every 1V period, a vertical start signal YST is provided, and in response to which, the scan driver 120 sequentially provides a scan signal of ON level.

When a still-image display period is switched to a normal display period, a digital memory reset period is set in the last frame of the still-image display period. Like a still-image write frame, the digital memory reset period sets the memory control line 19a to an ON level and the memory control line 19b to an OFF level. While the first switch 14 is being ON due to an ON-level scan signal, binary video data to entirely display black or white is sampled by each data line 11. This binary data is hereinafter referred to as "full-black/white data." The full-black/white data is written into each digital memory 18 through the first switch 14 and the switch element 21 of the second switch 17. As a result, still-image data in all of the digital memories 18 is updated to the full-black/white data.

At the start of the following normal display period, the memory control lines 19a and 19b are set to the OFF level, and the scan and data drivers 120 and 130 receive horizontal/vertical clock and start signals and video data.

The full-black/white data written into the digital memories 18 in the preceding digital memory reset period is held therein until the next still-image display period. To keep the potential of the full-black/white data in the digital memories 18, the digital memories 18 are charged at predetermined intervals.

When the normal display period with the digital memories 18 holding the full-black/white data is switched to a still-image display period, new still-image data is written into the digital memories 18 during a still-image writing period. Until the completion of this writing operation, the previously written full-black/white data is displayed. This full-black/white data is displayed only during the still-image writing period, and the still-image display period that follows displays a multicolor image based on the newly written still-image data.

The driving method of the embodiment 2 displays black or white on full screen when a normal display period is switched to a still-image display period. Compared with the prior art that displays previous irrelevant still-image data when a normal display period is switched to a still-image display period, the embodiment 2 provides a user with no strange feeling or visual disturbance. Namely, the embodiment 2 secures high display quality even at a display mode switching time.

A modification of the embodiment 2 may write the same binary video data for each of red, green, and blue colors into the digital memories 18 during a digital memory reset period and may display a colored raster image based on the written video data at a display mode switching time.

Embodiment 3

The embodiment 3 of the present invention relates to an LCD having memory control lines provided with potential controllers.

Figure 8:
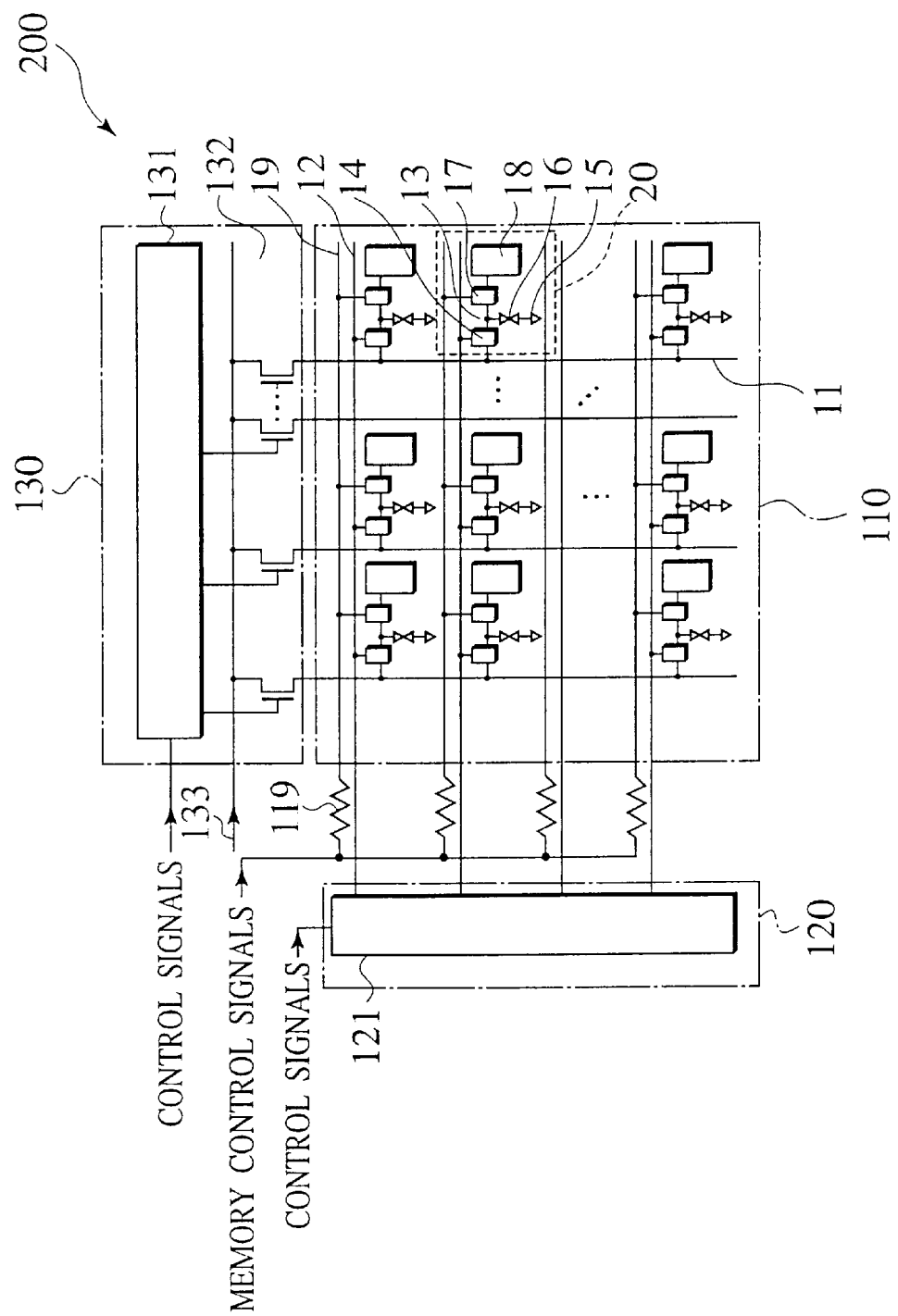
FIG. 8 is a circuit diagram showing an LCD according to embodiment 3 of the present invention.

FIG. 8 is a circuit diagram showing the LCD 200 of the embodiment 3. In FIG. 8, the same parts as those of FIG. 1 are represented with like reference numerals. Only the difference of the embodiment 3 from the embodiment 1 will be explained. The structures, operations, and effects of the embodiment 3 that are the same as those of the preceding embodiments will not be explained.

In FIG. 8, a memory control line 19 receives a memory control signal from an external driver (not shown). The memory control signal is first transmitted through a single memory control line and is branched to a plurality of memory control lines 19 just before a display panel 110. Before entering the display panel 110, each memory control line 19 is provided with a resistive element 119 serving as a potential controller.

Figure 9:
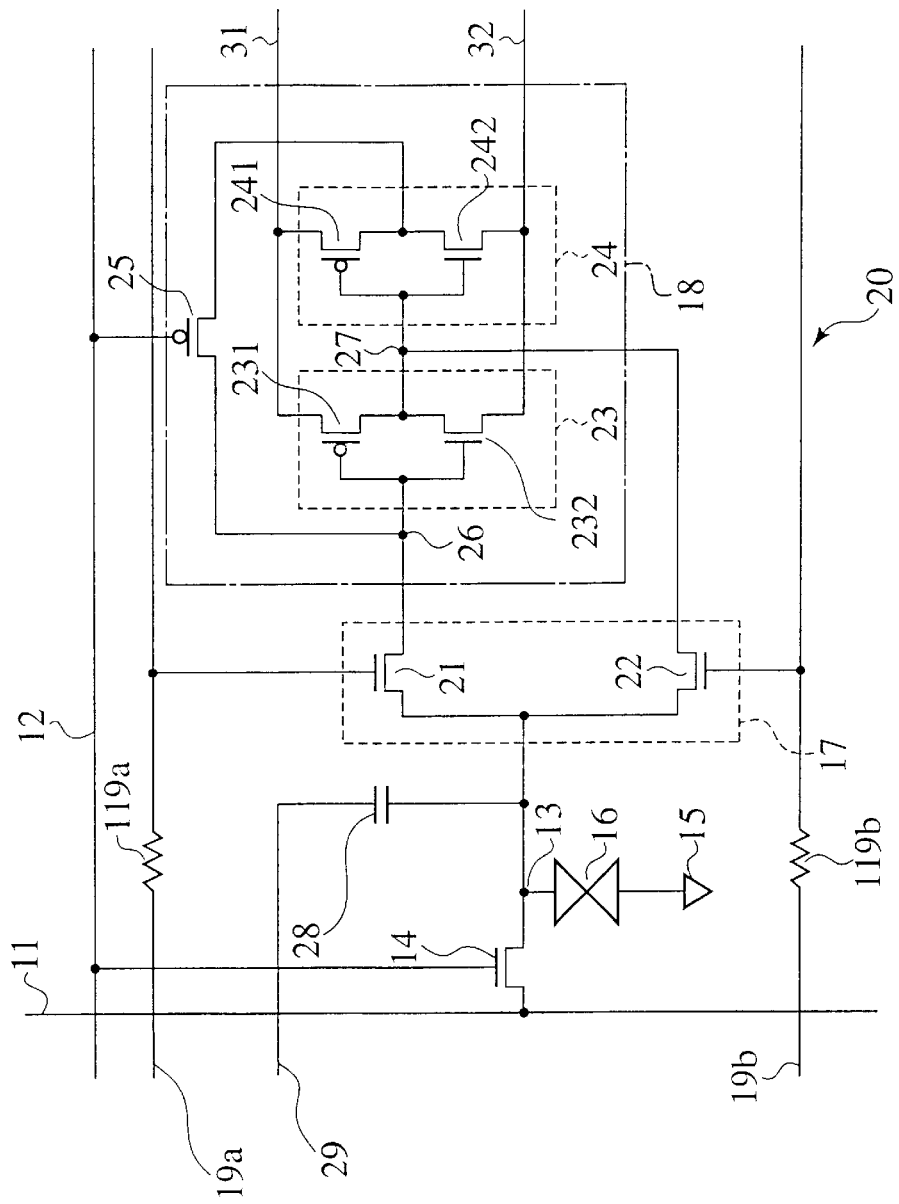
FIG. 9 is a circuit diagram showing a display pixel of the LCD of the embodiment 3.

Like the embodiment of FIG. 1, each memory control line 19 of FIG. 8 actually consists of memory control lines 19a and 19b. Accordingly, the resistive element 119 is provided for each of the memory control lines 19a and 19b. In FIG. 8, the resistive element 119 is symbolically depicted for the sake of simplicity. In practice, resistive elements 119a and 119b are connected to each pair of the data lines 19a and 19b, respectively. A pair of the resistive elements 119a and 119b is shown in FIG. 9. Like the first embodiment, the memory control signal may be supplied from a scan driver 120 instead of the external driver.

The circuit structure of a display pixel 20 of the embodiment 3 will be explained with reference to FIG. 9. In FIG. 9, the same parts as those of FIG. 3 are represented with like reference numerals.

The resistive element 119a is connected between a second switch 17 and the memory control line 19a, and the resistive element 119b is connected between the second switch 17 and the memory control line 19b. The resistive elements 119a and 119b control a rise of the memory control signal supplied from the external driver (not shown). The resistance value of each of the resistive elements 119a and 119b is determined so that the potential of the memory control signal supplied to the memory control lines 19a and 19b may rise after a power source potential supplied to a power source line 31 of a digital memory 18 has risen to a specified level.

The digital memory 18 consists of inverters 23 and 24 and a third switch 25. The inverter 23 consists of a p-channel TFT 231 and an n-channel TFT 232 that are connected in series. The inverter 24 consists of a p-channel TFT 241 and an n-channel TFT 242 that are connected in series. The third switch 25 has an opposite channel from that of a first switch 14. Namely, the first and third switches 14 and 25 are made of complementary MOS transistors. The gate of the third switch 25 is connected to a scan line 12 to which the gate of the first switch 14 is connected. The positive pole side of the digital memory 18 is connected to the positive power source line 31, and the negative pole side of the digital memory 18 is connected to a negative power source line 32.

To maintain a given potential relationship with respect to a common electrode 15, an auxiliary capacitor 28 is connected to a pixel electrode 13 in parallel. The auxiliary capacitor 28 produces capacitance Cs between the pixel electrode 13 and an auxiliary capacitor line 29. The auxiliary capacitor line 29 is electrically connected to the auxiliary capacitors 28 of all display pixels 20 and receives necessary potential from the external driver (not shown).

When the display pixel 20 displays halftone images and moving images during a normal display period, only the first switches 14, pixel electrodes 13, common electrode 15, and auxiliary capacitors 28 are active on the display panel 110. At this time, the second switches 17 and digital memories 18 are stopped, and the auxiliary capacitor line 29 receives normal potential to function the auxiliary capacitors 28.

When a normal display period is switched to a still-image display period, still-image data is written into the digital memories 18 in a still-image write frame. This still-image data is kept only for a short time. If it is kept for a long time, it will deteriorate a liquid crystal layer 16. To avoid this, the digital memories 18 must be driven with alternating current to keep the still-image data. The embodiment 3 alternately sets the memory control lines 19a and 19b to an ON level at predetermined intervals, to alternately enable switch elements 21 and 22 of the second switch 17. At the same time, the embodiment 3 alternately inverts the potential of the common electrode 15, to drive the digital memories 18 with alternating current.

When the second switch 17 is turned on, the power source line 31 of the digital memory 18 causes a voltage drop, to temporarily drop the potential of video data in the digital memory 18. If the video data is supplied to the pixel electrode 13 before the potential thereof is restored, it will cause a memory malfunction. To avoid this, the embodiment 3 arranges the resistive elements 119a and 119b between the second switch 17 and the memory control lines 19a and 19b, so that the potential of memory control signals supplied to the memory control lines 19a and 19b rises after a rise of power source potential supplied to the power source line 31 of the digital memory 18. Even if the power source line 31 causes a voltage drop to temporarily drop the potential of video data in the digital memory 18, the switch elements 21 and 22 are enabled only after the video data restores original potential. As a result, the pixel electrode 13 always receives video data of proper potential. Namely, a voltage drop in the power source line 31 causes no memory malfunction, thereby always stably displaying images.

During the still-image display period, potential to the pixel electrode 13 is supplied from the digital memory 18, and therefore, the potential of the auxiliary capacitor 28 becomes irrelevant to displaying images. The auxiliary capacitor line 29, therefore, can receive potential that is lower than potential applied to the auxiliary capacitors 28 during a normal display period. This results in reducing power consumption.

The embodiment 3 needs no widening of wiring on a substrate to reduce the resistance of the power source lines 31 of the digital memories 18. Namely, the embodiment 3 realizes low power consumption without increasing pixel pitches or a frame size, and therefore, realizes high resolution and a small frame area.

Figure 10:
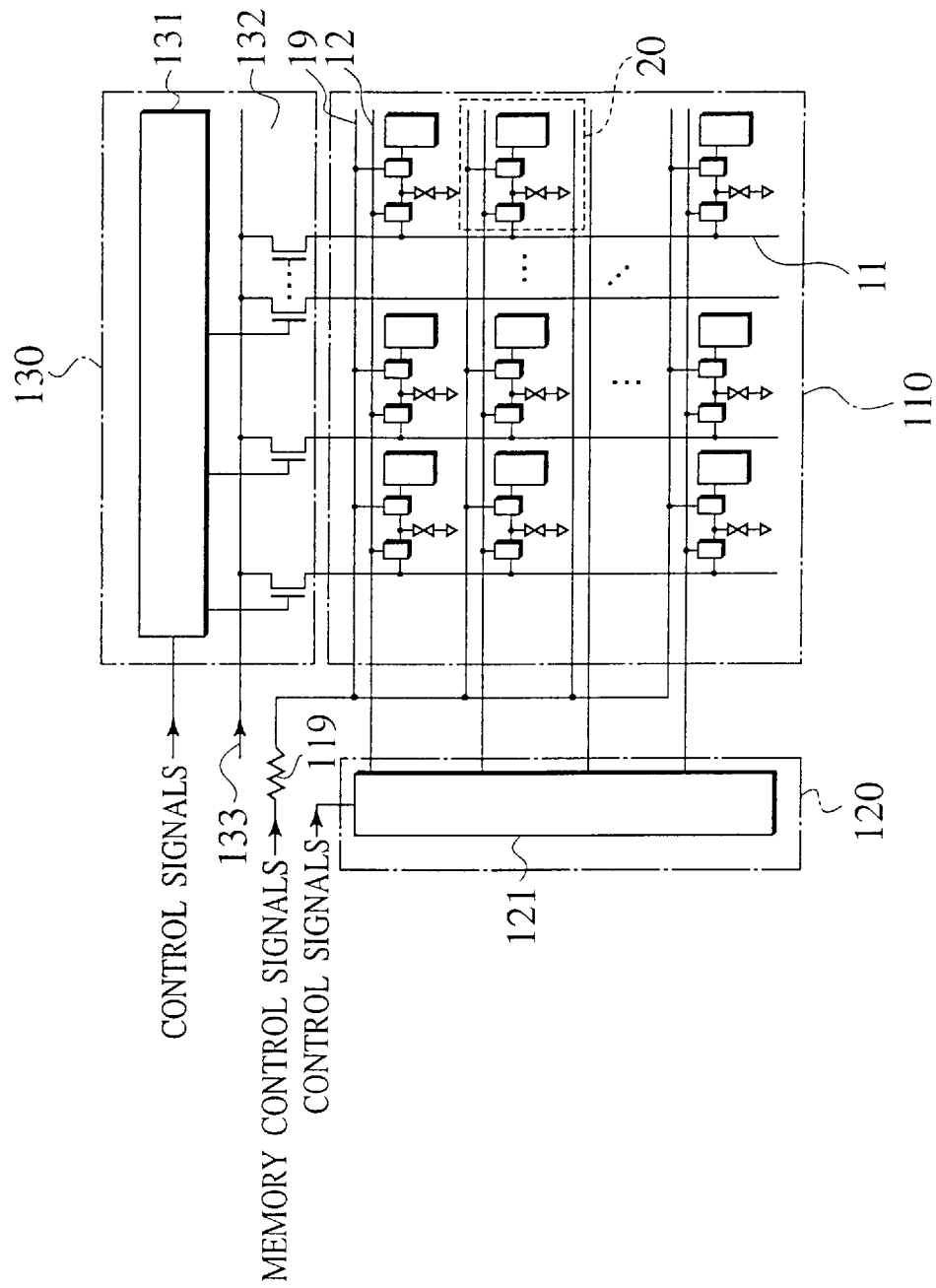
FIG. 10 is a circuit diagram showing an LCD according to a modification of the embodiment 3.

In FIG. 9, the memory control lines 19a and 19b are provided with the resistive elements 119a and 119b, respectively. Instead, a resistive element 119 may be inserted into a memory control line 19 before a position where the memory control line 19 is divided into branches, as shown in FIG. 10.

Instead of providing the memory control line 19 with the resistive element(s) 119 on an array substrate, the external driver (not shown) may delay a rise of a memory control signal and may supply the delayed memory control signal to the memory control line 19. This also provides the effect of the embodiment 3.

Figure 11:
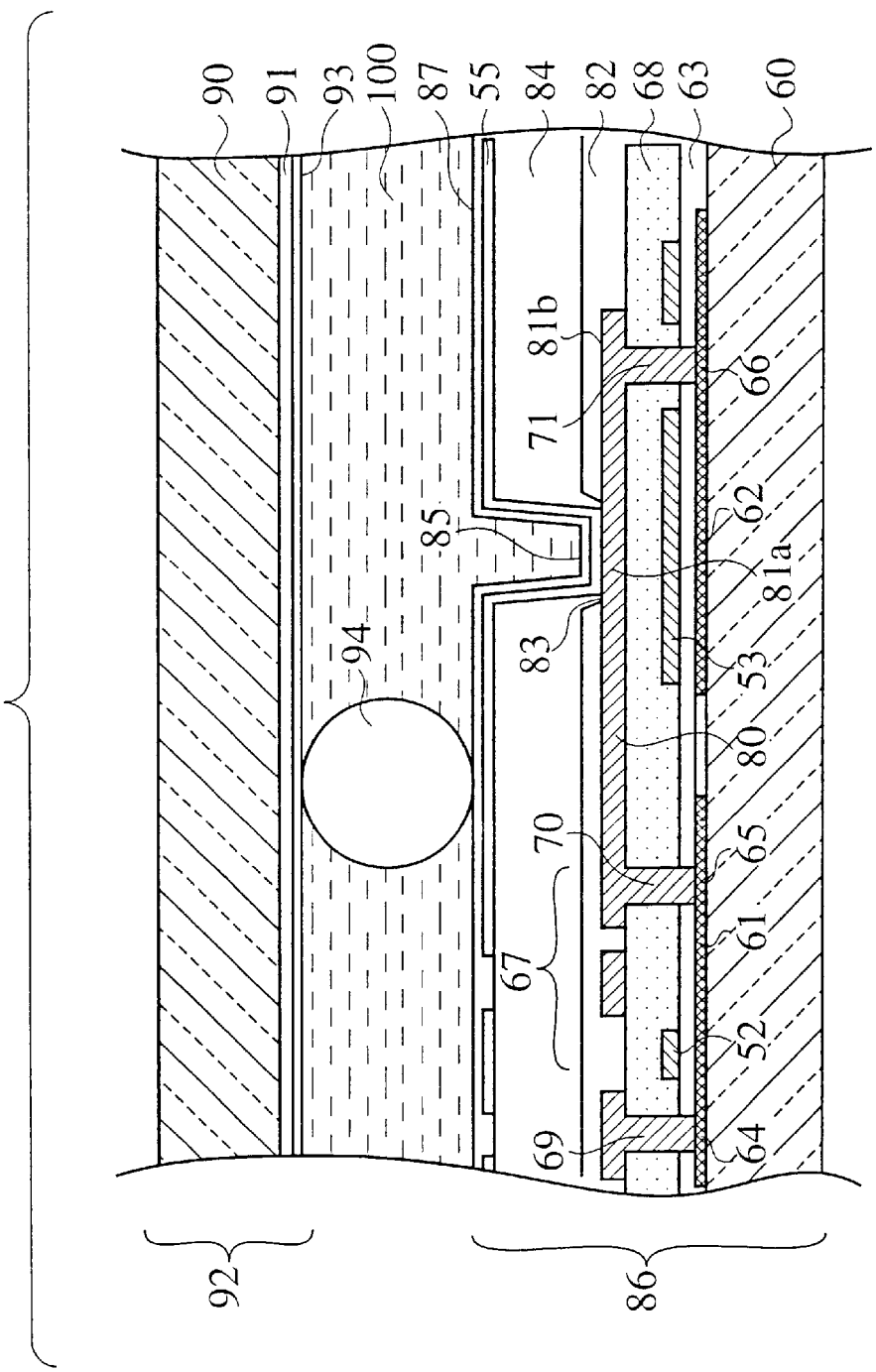
FIG. 11 is a sectional view showing a method of manufacturing the LCD of the embodiment 3.

A method of manufacturing the LCD 200 of the embodiment 3 will be explained with reference to FIG. 11, which is a sectional view roughly showing the LCD 200. Manufacturing processes of the LCD 200 will sequentially be explained. In the following explanation, any parenthesized reference numeral represents a part shown in FIGS. 2, 8, 9, and 10, and other reference numerals represent parts shown in FIG. 11.

On a transparent insulating substrate 60 made of glass or quartz, an amorphous silicon (a-Si) thin film is formed by, for example, CVD to a thickness of about 50 nm. The substrate 60 is annealed in a furnace at 450° C. An XeCl excimer laser beam is emitted to provide a-Si with a polycrystalline structure. The polysilicon film is patterned by photoetching, to form a channel layer 61 for TFTs (pixel TFTs) of a display panel (110), a channel layer (not shown) for TFTs (circuit TFTs) in driver regions (120, 130), and a polysilicon film for lower electrodes 62 of auxiliary capacitors (28).

Over the substrate 60, an SiOx film 63 serving as a gate insulating film is formed to a thickness of about 100 nm. The SiOx film 63 is covered by about 400 nm with a film of Ta, Cr, Al, Mo, W, Cu, or any other material, or a lamination of films of such materials, or an alloy film of such materials. The film(s) is patterned by photoetching to form scan lines (12), gate electrodes 52 of the pixel TFTs that are the extensions of the scan lines, auxiliary capacitor lines 53, upper electrodes (not shown) for the auxiliary capacitors (28) extended from the auxiliary capacitor lines 53, gate electrodes of the circuit TFTs (not shown), and wiring for the driver regions.

The gate electrodes are used as masks to implant impurities by ion implantation or ion doping, to form drain electrodes 64 and source electrodes 65 for the pixel TFTs, contact regions 66 for the lower electrodes of the auxiliary capacitors (28), and the source and drain electrodes of the n-type circuit TFTs (not shown). The impurity implantation is carried out with, for example, high-concentration phosphorus $PH_3/H_2$ of $5\times10^{15}$ atoms/cm$^2$ at an acceleration voltage of 80 KeV.

A resist is formed so that no impurities are implanted into the pixel TFTs and n-type circuit TFTs (not shown) in the driver regions. The resist and the gate electrodes of p-type TFTs (not shown) are used as masks to implant high-concentration boron $B_2H_6/H_2$ of $5\times10^{15}$ atoms/cm$^2$ at 80 KeV, to form the source and drain electrodes of the p-type circuit TFTs. Impurities to form n-type LDDs are implanted, and the substrate 60 is annealed to activate the impurities.

An insulating interlayer $SiO_2$ film 68 of about 500 nm thick is formed over the substrate 60 by, for example, PECVD.

Photoetching is carried out to form contact holes 69 reaching the drain electrodes 64 of the pixel TFTs, contact holes 70 reaching the source electrodes 65, contact holes 71 reaching the contact regions 66 of the lower electrodes of the auxiliary capacitors (28), and contact holes reaching the source and drain electrodes of the circuit TFTs (not shown).

A film of Ta, Cr, Al, Mo, W, Cu, or any other material, a lamination of films made of such materials, or an alloy film made of such materials is formed to a thickness of about 500 nm and is patterned by photoetching to form data lines (11), contacts between the drain electrodes 64 of the pixel TFTs and the data lines (11), pixel electrode lines 80 for connecting the source electrodes 65 to pixel electrodes (13), pixel electrode contacts 81a that are integral with the pixel electrode lines 80, auxiliary capacitor electrode contacts 81b that are integral with the pixel electrode contacts 81a, and wiring for the circuit TFTs (not shown) in the driver regions.

A protective insulating film 82 made of SiNx is formed over the substrate 60 by PECVD. Contact holes 83 reaching the pixel electrode contacts 81a are formed by photoetching.

A colored layer 84 with, for example, dispersed pigments is entirely formed to a thickness of about 2 μm. Contact holes 85 reaching pixel electrodes 55 to be explained later and the pixel electrode contacts 81a are formed.

An Al film is formed by spattering and is patterned by photoetching to form the pixel electrodes 55. The pixel electrodes 55 and the source electrodes 67 of the pixel TFTs are connected, to form an array substrate 86.

On a transparent insulating substrate 90 made of, for example, glass, transparent common electrode 91 made of, for example, ITO are formed by spattering, to provide a opposing substrate 92.

On the pixel electrode 55 side of the array substrate 86 and on the common electrode 91 side of the opposing substrate 92, orientation films 87 and 93 are entirely formed from low-temperature-cure-type polyimide by printing. Rubbing is carried out to provide a liquid crystal orientation axis of 90° when the substrates 86 and 92 are set to face each other. The substrates 86 and 92 are arranged to face each other with a spacer 94 keeping a predetermined gap between them. The peripheries of the substrates 86 and 92 are sealed with sealing material (not shown) to define cells. Nematic liquid crystals 100 are injected into a space in each cell, and an injection opening is sealed. A polarizing plate (not shown) is bonded to each outer side of the substrates 86 and 92, to complete the LCD.

According to the embodiment 3, each pixel electrode 55 is a reflective electrode made of Al. The pixel electrode 55 may be a transmission electrode.

The embodiment 3 arranges the pixel electrode contact 81a on a pixel area. Instead, it may be arranged under the pixel area.

The embodiment 3 forms the colored layer 84 on the array substrate 86. Instead of the colored layer, an organic insulating film may be employed to provide the same effect.

Embodiment 4

The embodiment 4 of the present invention relates to an LCD employing auxiliary capacitor lines that serve as power source lines for digital memories.

The circuit structure of the LCD of the embodiment 4 is the same as that of the LCD 100 of FIG. 1, and therefore, is not explained again. The circuit structure of a display pixel of the embodiment 4 is substantially the same as that of FIG. 9, and therefore, the same parts are represented with like reference numerals. Only characteristic parts of the embodiment 4 will be explained. The structures, operations, and effects of the embodiment 4 that are the same as those of the preceding embodiments are not explained.

Figure 12:
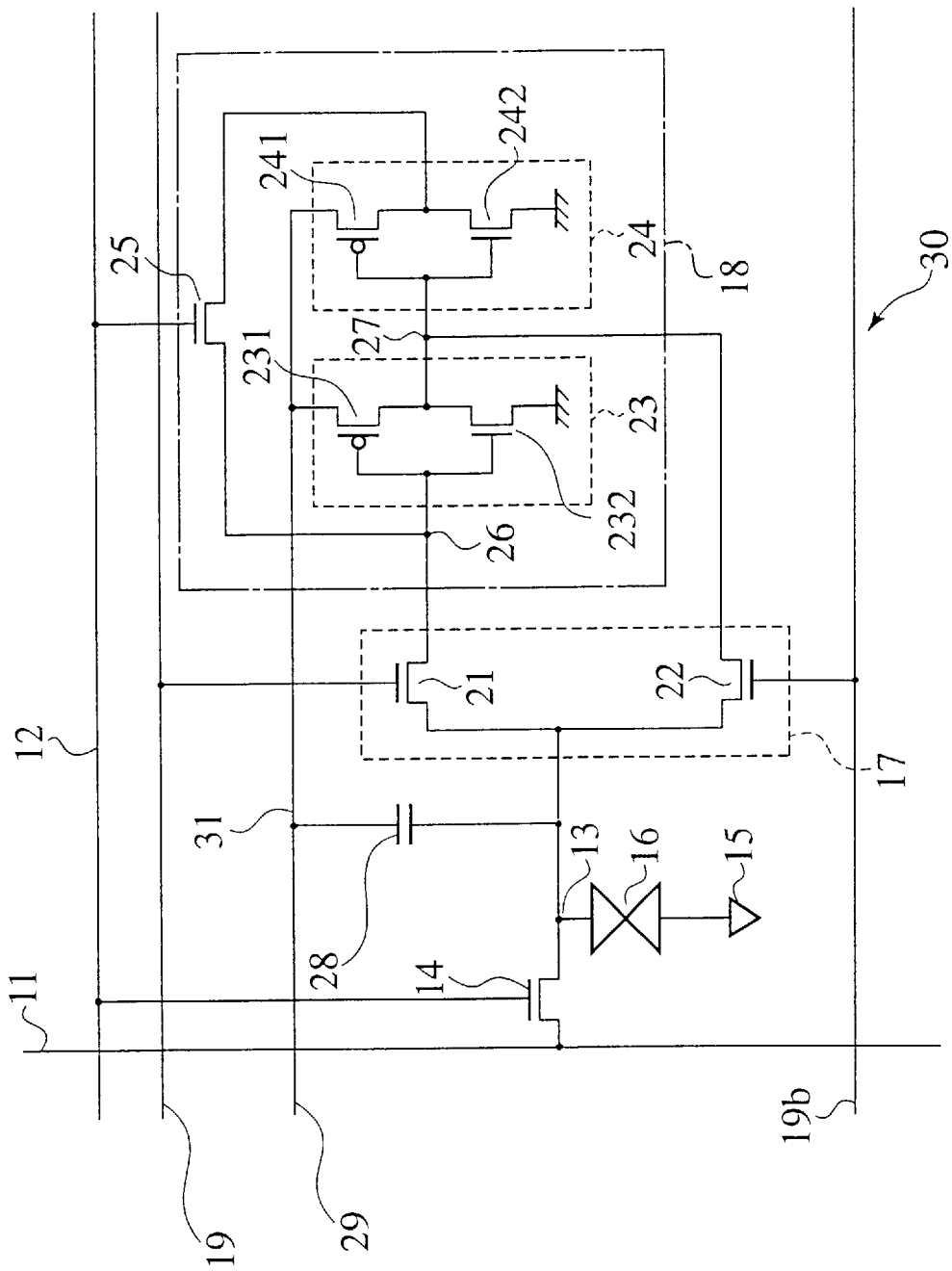
FIG. 12 is a circuit diagram showing a display pixel of an LCD according to embodiment 4 of the present invention.

FIG. 12 is a circuit diagram showing the display element 30 of the LCD of the embodiment 4. An auxiliary capacitor line 29 for supplying potential to an auxiliary capacitor 28 serves as a power source line 31 of a digital memory 18. The power source line 31 is a positive power source line for supplying potential to the positive side of the digital memory 18. The power source line 31 may be a negative power source line for supplying potential to the negative side of the digital memory 18. In this embodiment, the power source line 31 is extended from the n-channel TFT side of inverters 23 and 24 of the digital memory 18 and becomes the auxiliary capacitor line 29. The auxiliary capacitor line 29 serving as the power source line 31 receives potential, which varies depending on a displaying state, from an external driver (not shown).

The display pixel 30 having the auxiliary capacitor line 29 serving as the power source line 31 of the digital memory 18 needs no separate power source lines on a substrate. Namely, the embodiment 4 reduces the number of wires on a substrate, to narrow pixel pitches, realize high resolution, reduce wire-to-wire short circuits, and improve yield.

The LCD of the embodiment 4 is manufacturable according to the processes explained with reference to FIG. 11.

Although the embodiments 1 to 4 of the present invention relate to LCDs, the display layer of the present invention is not limited to a liquid crystal layer. The display layer may be made of another material. For example, the display layer of the present invention may be made of emitting phosphor to form an organic EL (electroluminescence) panel.

What is claimed is:

1. A display comprising:
   a first electrode substrate having scan lines, data lines intersecting the scan lines, pixel electrodes formed at the intersections of the scan and data lines, respectively, and first switches each inserted between the corresponding data line and pixel electrode, each of the first switches being turned on and off in response to a scan signal supplied from the corresponding scan line, and when turned on, electrically connecting the corresponding data line to the corresponding pixel electrode so that video data from the data line is written into the pixel electrode;
   a second electrode substrate having a common electrode that faces the pixel electrodes with a predetermined gap between them;
   a display layer held between the first and second electrode substrates;
   a data driver for supplying video data to the data lines; and
   a scan driver for sequentially supplying a scan signal to the scan lines, wherein the first electrode substrate has:
   digital memories electrically connected to the pixel electrodes, respectively, and holding video data supplied from the data lines; and
   second switches each inserted between the corresponding pixel electrode and digital memory, to control conduction between the pixel electrode and the digital memory, wherein:
   each of the second switches consists of two switch elements for connecting the output terminal and inverted output terminal of the corresponding digital memory to the corresponding pixel electrode, the two switch elements being connected to the memory control lines, respectively.

2. The display of claim 1, wherein:
   the corresponding pixel electrode and data line are connected to each other through the corresponding first switch, and the corresponding pixel electrode and digital memory are connected to each other through the corresponding second switch.

3. The display of claim 1, wherein:
   each of the digital memories consists of two inverters and a third switch.

4. The display of claim 1, wherein:
   the pixel electrodes are each a light reflective pixel electrode made of a metal thin film.

5. The display of claim 1, wherein:
   the display layer is a liquid crystal layer.

6. The display of claim 1, wherein:
   in a first display period, the second switches are disabled to cut conduction between the pixel electrodes and the digital memories, and the first switches are enabled at predetermined intervals to write video data from the data lines into the pixel electrodes and display the video data; and in a second display period, the second switches are enabled to store video data from the data lines into the digital memories, and thereafter, the first switches are disabled to cut conduction between the data lines and the pixel electrodes, so that the video data stored in the digital memories is written into the pixel electrodes and is displayed.

7. The display of claim 6, wherein:
the video data is stored in the digital memories before the second display period is switched to the first display period.

8. The display of claim 7, wherein:
the video data is one of full-black video data and full-white video data.

9. The display of claim 6, wherein:
in the second display period, the two switch elements of each of the second switches are alternately turned on frame by frame, and in synchronization with this, the potential of the common electrode is inverted.

10. A display comprising:
a first electrode substrate having scan lines, data lines intersecting the scan lines, pixel electrodes formed at the intersections of the scan and data lines, respectively, auxiliary capacitors electrically connected in parallel with the pixel electrodes, respectively, auxiliary capacitor lines for supplying a predetermined voltage to the auxiliary capacitors, first switches provided for the pixel electrodes, respectively, each first switch being turned on and off in response to a scan signal supplied from the corresponding scan line, and when turned on, writing video data from the corresponding data line into the corresponding pixel electrode, digital memories electrically connected to the pixel electrodes, respectively, and holding video data supplied from the data lines, and second switches each arranged between the corresponding pixel electrode and digital memory, to control conduction between the pixel electrode and the digital memory;
a second electrode substrate having a common electrode that faces the pixel electrodes with a predetermined gap between them; and
a display layer held between the first and second electrode substrates,
wherein:
the auxiliary capacitor lines serve as power source lines for the digital memories.

11. The display of claim 10, wherein:
the power source line of each digital memory is one of a positive power source line and a negative power source line.

12. The display of claim 10, wherein:
the corresponding pixel electrode and data line are connected to each other through the corresponding first switch, and the corresponding pixel electrode and digital memory are connected to each other through the corresponding second switch.

13. The display of claim 10, wherein:
each of the second switches consists of two switch elements for connecting the output terminal and inverted output terminal of the corresponding digital memory to the corresponding pixel electrode, the two switch elements being connected to the memory control lines, respectively.

14. The display of claim 10, wherein:
each of the digital memories consists of two inverters and a third switch.

15. The display of claim 10, wherein:
the pixel electrodes are each a light reflective pixel electrode made of a metal thin film.

16. The display of claim 10, wherein:
the display layer is a liquid crystal layer.

17. A display comprising:
a first electrode substrate having scan lines, data lines intersecting the scan lines, pixel electrodes formed at the intersections of the scan and data lines, respectively, auxiliary capacitors electrically connected in parallel with the pixel electrodes, respectively, auxiliary capacitor lines for supplying a predetermined voltage to the auxiliary capacitors, first switches provided for the pixel electrodes, respectively, each first switch being turned on and off in response to a scan signal supplied from the corresponding scan line, and when turned on, electrically connecting the corresponding data line to the corresponding pixel electrode so that video data from the data line is written into the pixel electrode, digital memories electrically connected to the pixel electrodes, respectively, and holding video data supplied from the data lines, second switches each arranged between the corresponding pixel electrode and digital memory, to control conduction between the pixel electrode and the digital memory, and memory control lines provided for the second switches, respectively, for supplying memory control signals to turn on and off the second switches;
a second electrode substrate having a common electrode that faces the pixel electrodes with a predetermined gap between them;
a display layer held between the first and second electrode substrates; and potential control means connected between the second switches and the memory control lines, to control a rise of the memory control signal.

18. The display of claim 17, wherein:
the potential control means consists of a resistive element, the resistance value of the resistive element being designed so that the potential of each memory control line may rise after the potential of the power source line of the corresponding digital memory has risen to a specified level.

19. The display of claim 17, wherein:
the corresponding pixel electrode and data line are connected to each other through the corresponding first switch, and the corresponding pixel electrode and digital memory are connected to each other through the corresponding second switch.

20. The display of claim 17, wherein:
each of the second switches consists of two switch elements for connecting the output terminal and inverted output terminal of the corresponding digital memory to the corresponding pixel electrode, the two switch elements being connected to the memory control lines, respectively.

21. The display of claim 17, wherein:
each of the digital memories consists of two inverters and a third switch.

22. The display of claim 21, wherein:
the corresponding third and first switches consist of complementary MOS transistors, and the gate of the third switch and the gate of the first switch are connected to the same scan line.

23. The display of claim 17, wherein:
the pixel electrodes are each a light reflective pixel electrode made of a metal thin film.

24. The display of claim 17, wherein:

the display layer is a liquid crystal layer.

25. A first electrode substrate having scan lines, data lines intersecting the scan lines, pixel electrodes formed at the intersections of the scan and data lines, respectively, and first switches provided for the pixel electrodes, respectively, each of the first switches being turned on and off in response to a scan signal supplied from the corresponding scan line, and when turned on, electrically connecting the corresponding data line to the corresponding pixel electrode so that video data from the data line is written into the pixel electrode;

a second electrode substrate having a common electrode that faces the pixel electrodes with a predetermined gap between them;

a display layer held between the first and second electrode substrates;

a data driver for supplying video data to the data lines; and a scan driver for sequentially supplying a scan signal to the scan lines, wherein the first electrode substrate has:

digital memories electrically connected to the pixel electrodes, respectively, and holding video data supplied from the data lines; and second switches each inserted between the corresponding pixel electrode and digital memory, to control conduction between the pixel electrode and the digital memory, and wherein:

each of the digital memories consists of two inverters and a third switch.

26. A first electrode substrate having scan lines, data lines intersecting the scan lines, pixel electrodes formed at the intersections of the scan and data lines, respectively, and first switches provided for the pixel electrodes, respectively, each of the first switches being turned on and off in response to a scan signal supplied from the corresponding scan line, and when turned on, electrically connecting the corresponding data line to the corresponding pixel electrode so that video data from the data line is written into the pixel electrode;

a second electrode substrate having a common electrode that faces the pixel electrodes with a predetermined gap between them;

a display layer held between the first and second electrode substrates;

a data driver for supplying video data to the data lines; and a scan driver for sequentially supplying a scan signal to the scan lines, wherein the first electrode substrate has:

digital memories electrically connected to the pixel electrodes, respectively, and holding video data supplied from the data lines; and second switches each inserted between the corresponding pixel electrode and digital memory, to control conduction between the pixel electrode and the digital memory, and wherein:

in a first display period, the second switches are disabled to cut conduction between the pixel electrodes and the digital memories, and the first switches are enabled at predetermined intervals to write video data from the data lines into the pixel electrodes and display the video data; and in a second display period, the second switches are enabled to store video data from the data lines into the digital memories, and thereafter, the first switches are disabled to cut conduction between the data lines and the pixel electrodes, so that the video data stored in the digital memories is written into the pixel electrodes and is displayed.

27. The display of claim 26, wherein:

third video data is stored in the digital memories before the second display period is switched to the first display period.

28. The display of claim 26, wherein:

the third video data is one of full-black video data and full-white video data.

29. The display of claim 26, wherein:

in the second display period, the two switch elements of each of the second switches are alternately turned on frame by frame, and in synchronization with this, the potential of the common electrode is inverted.

* * * * *